United States Patent
Mohite et al.

(10) Patent No.: US 11,378,464 B2
(45) Date of Patent: Jul. 5, 2022

(54) TEMPERATURE SENSOR CLAMPING SYSTEMS AND METHODS

(71) Applicant: Johnson Controls Technology Company, Auburn Hills, MI (US)

(72) Inventors: Swapnil V. Mohite, Pune (IN); Ravindra B. Salunkhe, Satara (IN); Ritesh D. Rokade, Pune (IN); Bhushan D. Vichare, Sangli (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 475 days.

(21) Appl. No.: 16/385,967

(22) Filed: Apr. 16, 2019

(65) Prior Publication Data
US 2020/0326241 A1     Oct. 15, 2020

Related U.S. Application Data

(60) Provisional application No. 62/832,099, filed on Apr. 10, 2019.

(51) Int. Cl.
*G01K 1/00* (2006.01)
*G01K 1/143* (2021.01)

(52) U.S. Cl.
CPC ......... *G01K 1/143* (2013.01); *G01K 2201/00* (2013.01)

(58) Field of Classification Search
USPC .............................. 374/208; 248/62; 16/421
See application file for complete search history.

(56) References Cited

U.S. PATENT DOCUMENTS 3,376,004 A * 4/1968 Goldman ............... F16L 3/123
                                                        248/74.3
4,068,966 A * 1/1978 Johnson ............... F16B 7/0433
                                                        174/47
(Continued)

FOREIGN PATENT DOCUMENTS

CN           1979104 A       6/2007
CN         201983867 U       9/2011
(Continued)

*Primary Examiner* — Lisa M Caputo
*Assistant Examiner* — Nasir U. Ahmed
(74) *Attorney, Agent, or Firm* — Fletcher Yoder P.C.

(57) ABSTRACT

The embodiments described herein include sensor mounting clamps configured to lock a sensor, such as a temperature sensor, in place relative to a structure, such as a pipe or tube, of a heating, ventilating, and/or air conditioning (HVAC) unit. More specifically, the sensor mounting clamps described herein include sensor mounting portions configured to receive a sensor, and to hold the sensor in place relative to a structure of an HVAC unit. In addition, the sensor mounting clamps described herein include locking mechanisms having interlocking pockets configured to lock the sensor mounting clamps in place around a structure of an HVAC unit. For example, the sensor mounting clamps described herein may include interlocking pockets having interior passages configured to receive a retention piece, such as a cotter pin, cylindrical pin, or screw, to lock the interlocking pockets in place relative to each other, or may include interlocking pockets configured to directly engage with each other. In addition, the sensor mounting clamps described herein may include a flange configured to constrain longitudinal motion of a sensor.

23 Claims, 11 Drawing Sheets

(56) References Cited

U.S. PATENT DOCUMENTS

| | | | | |
|---|---|---|---|---|
| 4,884,528 A | * | 12/1989 | Steadier, Jr. | A01K 7/00 119/72.5 |
| 7,959,114 B2 | * | 6/2011 | Spreitzer | F16L 3/1083 248/62 |
| 8,322,151 B1 | | 12/2012 | Garofalo | |
| 2003/0015872 A1 | * | 1/2003 | Potts | F16L 21/005 285/420 |
| 2009/0190630 A1 | * | 7/2009 | Hong | G01K 1/143 374/208 |
| 2009/0302601 A1 | * | 12/2009 | Sarkisyan | F16L 21/005 285/337 |
| 2010/0314870 A1 | * | 12/2010 | Cromarty | F16L 25/0018 285/420 |
| 2014/0339821 A1 | * | 11/2014 | Ishizaka | F16L 37/12 285/319 |
| 2016/0209095 A1 | | 7/2016 | Parker et al. | |
| 2017/0284870 A1 | * | 10/2017 | Golden | F16B 2/22 |
| 2018/0259373 A1 | | 9/2018 | Staton et al. | |

FOREIGN PATENT DOCUMENTS

| | | |
|---|---|---|
| CN | 202938457 U | 5/2013 |
| CN | 203980720 U | 12/2014 |
| CN | 206973840 U | 2/2018 |

* cited by examiner

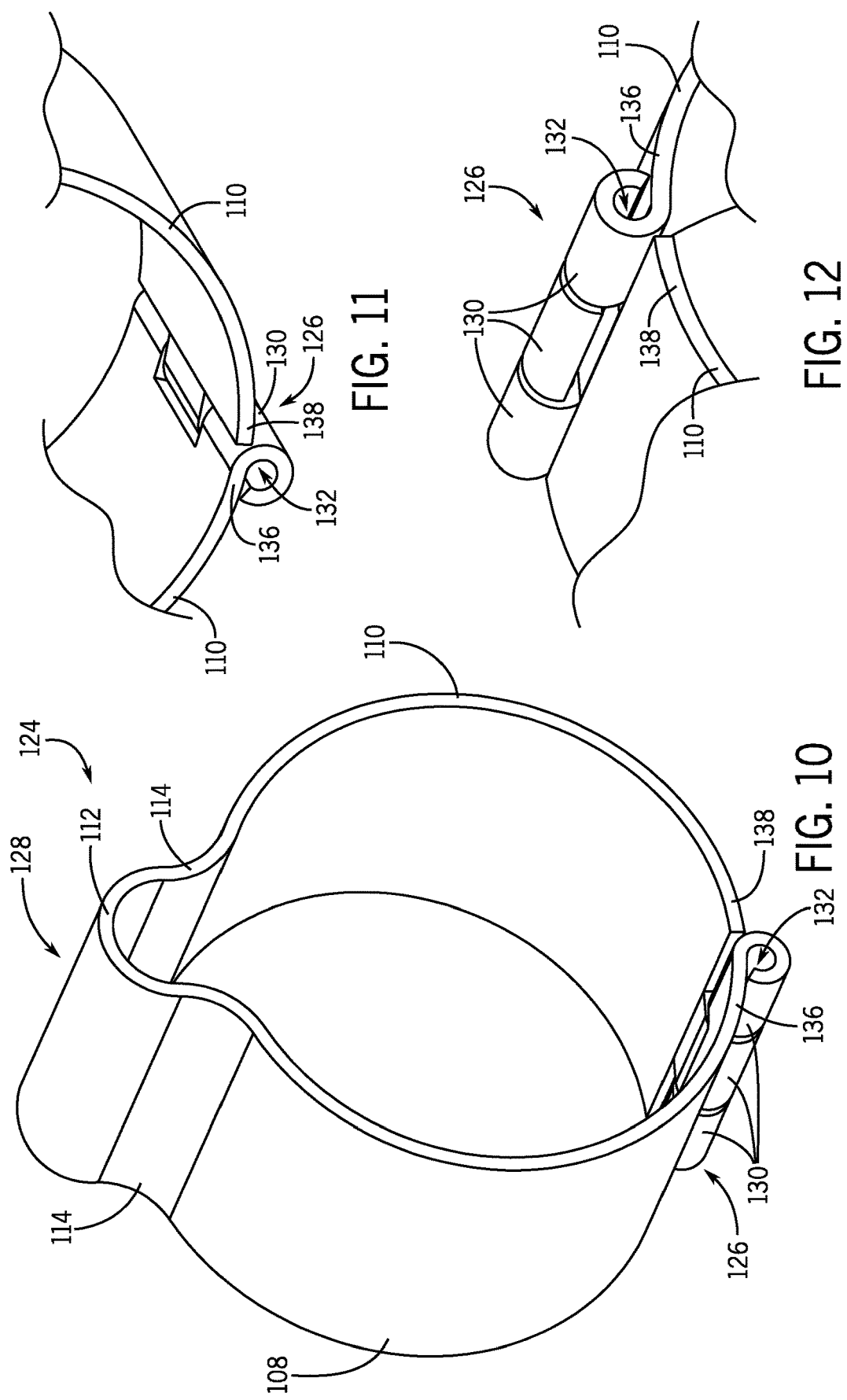

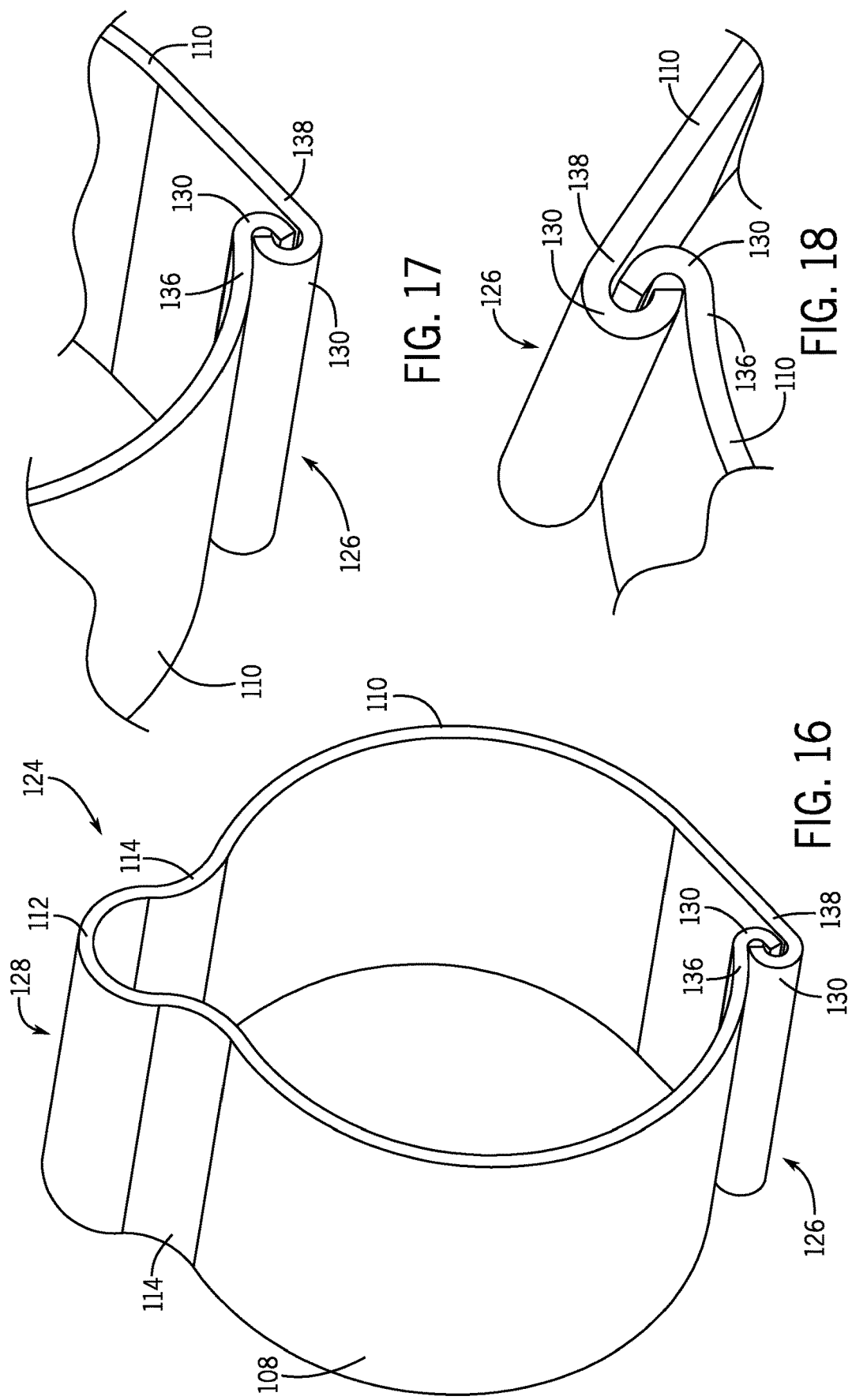

US 11,378,464 B2

TEMPERATURE SENSOR CLAMPING SYSTEMS AND METHODS

CROSS REFERENCE TO RELATED APPLICATION

This application claims priority from and the benefit of U.S. Provisional Application Ser. No. 62/832,099, entitled "TEMPERATURE SENSOR CLAMPING SYSTEMS AND METHODS," filed Apr. 10, 2019, which is hereby incorporated by reference in its entirety for all purposes.

BACKGROUND

The present disclosure relates generally to heating, ventilating, and/or air conditioning (HVAC) systems and, more particularly, to sensor mounting clamps configured to hold sensors, such as temperatures sensors, in place against structures, such as pipes or tubes, of HVAC systems.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Temperature measurement via temperature sensors plays a relatively important role in the operation of HVAC systems. However, in order to collect accurate temperature readings, temperature sensors generally should be locked into place relative to the HVAC systems, such as being locked into place adjacent pipes or tubes of the HVAC systems. In general, conventional sensor mounting systems do not provide adequate locking of temperature sensors relative to HVAC systems, thereby leading to less accurate temperature sensor readings.

SUMMARY

This section provides a brief summary of certain embodiments described in the present disclosure to facilitate a better understanding of the present disclosure. Accordingly, it should be understood that this section should be read in this light and not to limit the scope of the present disclosure. Indeed, the present disclosure may encompass a variety of aspects not summarized in this section.

The present disclosure relates to a sensor mounting clamp including a clamp wall. The clamp wall includes an annular segment cross-sectional portion having first and second ends configured to interlock with each other via interlocking pockets alternatingly extending from the first and second ends. The clamp wall also includes a sensor mounting portion extending radially outward from the annular segment cross-sectional portion. The sensor mounting portion is configured to receive and hold a sensor in place against a structure when the clamp wall is disposed around the structure.

The present disclosure also relates to a sensor mounting clamp including a clamp wall. The clamp wall includes a ring-shaped segment having first and second ends configured to interlock with each other via interlocking pockets alternatingly extending from the first and second ends. The interlocking pockets are configured to longitudinally align to receive a retention piece. The clamp wall also includes a sensor mounting portion extending radially outward from the ring-shaped segment. The sensor mounting portion is configured to receive and hold a sensor in place against a structure when the clamp wall is disposed around the structure.

The present disclosure also relates to a sensor mounting clamp including a clamp wall. The clamp wall includes a ring-shaped segment having first and second ends configured to interlock with each other via first and second interlocking pockets extending from respective first and second ends. The first and second interlocking pockets are configured to directly engage with each other. The clamp wall also includes a sensor mounting portion extending radially outward from the ring-shaped segment. The sensor mounting portion is configured to receive and hold a sensor in place against a structure when the clamp wall is disposed around the structure.

BRIEF DESCRIPTION OF THE DRAWINGS

Various aspects of the present disclosure may be better understood upon reading the detailed description and upon reference to the drawings, in which:

FIG. 10 is a perspective view of the sensor mounting clamp of FIGS. 8 and 9, in accordance with aspects of the present disclosure;

FIG. 11 is a partial perspective view of the sensor mounting clamp of FIG. 10, in accordance with aspects of the present disclosure;

FIG. 12 is a partial perspective view of the sensor mounting clamp of FIG. 10, in accordance with aspects of the present disclosure;

FIG. 16 is a perspective view of the sensor mounting clamp having interlocking pockets that are configured to directly engage with each other, in accordance with aspects of the present disclosure;

FIG. 17 is a partial perspective view of the sensor mounting clamp of FIG. 16, in accordance with aspects of the present disclosure;

FIG. 18 is a partial perspective view of the sensor mounting clamp of FIG. 16, in accordance with aspects of the present disclosure;

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is directed to sensor mounting clamps configured to lock a sensor, such as a temperature sensor, in place relative to a structure, such as a pipe or tube, of an HVAC unit. More specifically, the sensor mounting clamps described herein include sensor mounting portions configured to receive a sensor, and to hold the sensor in place relative to a structure of an HVAC unit. In addition, the sensor mounting clamps described herein include locking mechanisms having interlocking pockets configured to lock the sensor mounting clamps in place around a structure of an HVAC unit. For example, the sensor mounting clamps described herein may include interlocking pockets having interior passages configured to receive a retention piece, such as a cotter pin, cylindrical pin, or screw, to lock the interlocking pockets in place relative to each other, or may include interlocking pockets configured to directly engage with each other. In addition, the sensor mounting clamps described herein may include a flange configured to constrain longitudinal motion of a sensor.

Figure 1:
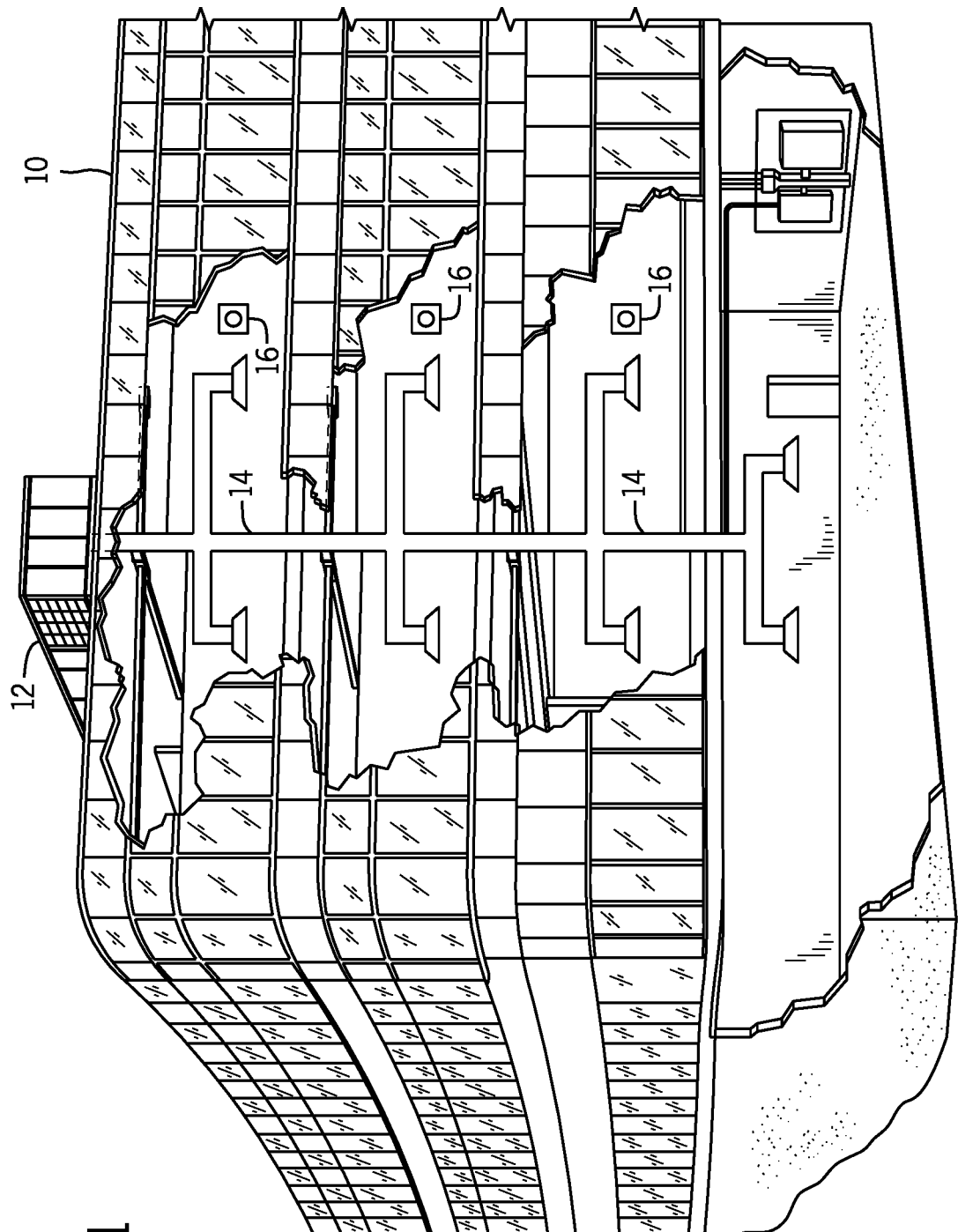
FIG. 1 is a partial cross-sectional view of an embodiment of a building that includes an HVAC system, in accordance with aspects of the present disclosure.

Turning now to the drawings, FIG. 1 illustrates an embodiment of an HVAC system for environmental management that may employ one or more HVAC units. As used herein, an HVAC system includes any number of components configured to enable regulation of parameters related to climate characteristics, such as temperature, humidity, air flow, pressure, air quality, and so forth. For example, an HVAC system as used herein is defined as conventionally understood and as further described herein. Components or parts of an HVAC system may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An HVAC system is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
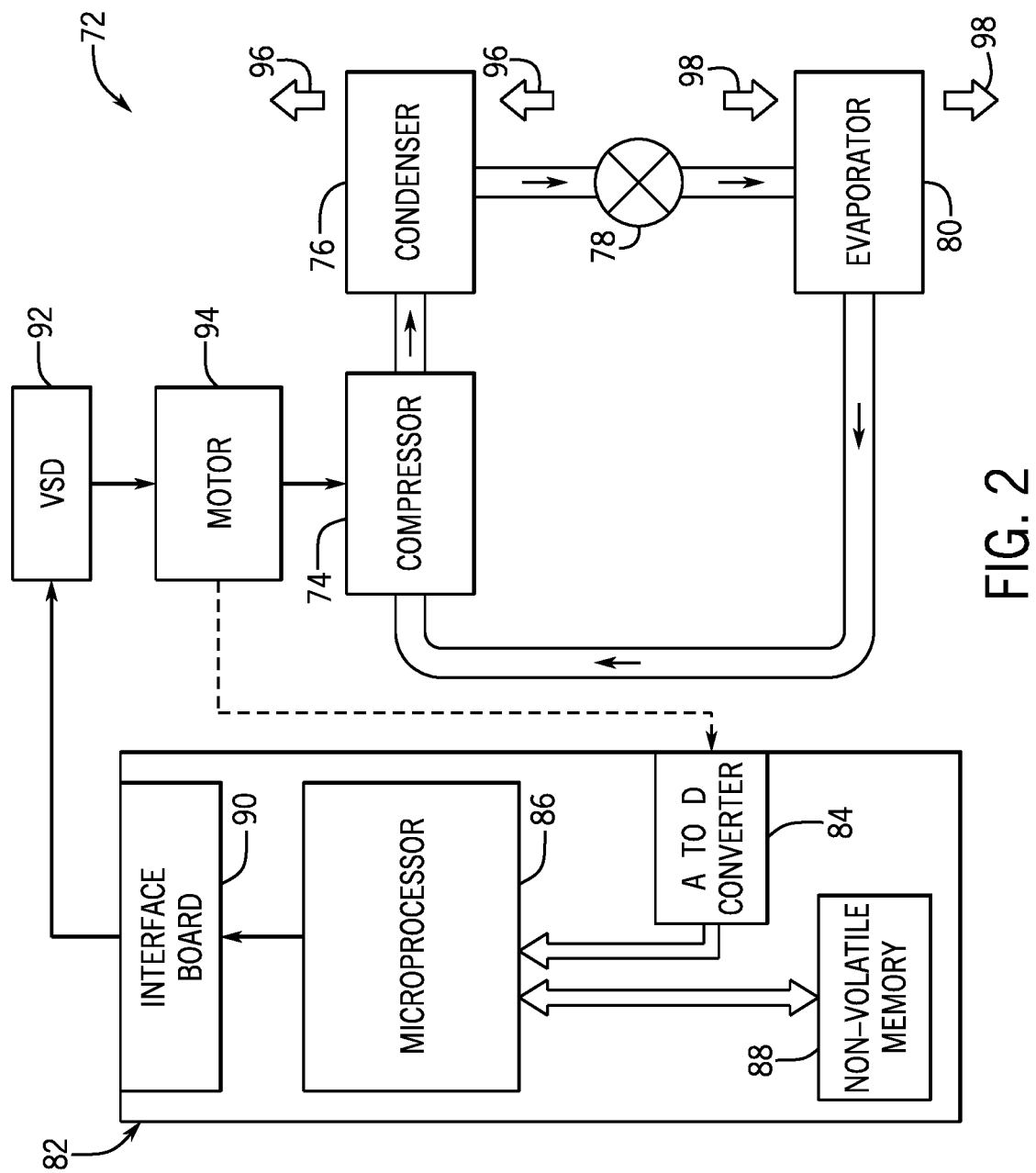
FIG. 2 is a schematic diagram of an embodiment of a vapor compression system that may be incorporated with an HVAC system, in accordance with aspects of the present disclosure.

FIG. 2 is an embodiment of a vapor compression system 72 that can be used in the HVAC unit 12 described herein. The vapor compression system 72 may circulate a refrigerant through a circuit starting with a compressor 74. The circuit may also include a condenser 76, an expansion valve(s) or device(s) 78, and an evaporator 80. As described in greater detail herein, the sensor mounting clamps described herein may, for example, be configured to be mounted in place around pipes, tubes, ducts, or other conduits that connect the compressor 74, the condenser 76, the expansion valve(s) or device(s) 78, the evaporator 80, and so forth. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10.

It should be appreciated that any of the features described herein may be incorporated with the HVAC unit 12 or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As described in greater detail herein, certain sensors such as temperature sensors may be disposed within or in the vicinity of the HVAC units 12 described herein to, for example, collect data relating to operation of the HVAC units 12. As a non-limiting example, in certain embodiments, temperature sensors may be disposed adjacent pipes, tubes, ducts, or other conduits of HVAC units 12 to detect temperatures of the pipes, tubes, ducts, or other conduits of the HVAC units 12. Indeed, in certain embodiments, other types of structures of the HVAC units 12 may benefit from having temperature sensors disposed adjacent these structures for the purpose of detecting temperatures of the structures.

The embodiments described herein include sensor mounting clamps configured to hold sensors, such as temperature sensors adjacent certain structures of the HVAC units 12 described herein. For example, the sensor mounting clamps described herein include sensor mounting portions configured to receive a sensor, and to hold the sensor in place relative to a structure of an HVAC unit 12. In addition, the sensor mounting clamps described herein include locking mechanisms having interlocking pockets configured to lock the sensor mounting clamps in place around a structure of an HVAC unit 12. For example, the sensor mounting clamps described herein may include interlocking pockets having interior passages configured to receive a retention piece, such as a cotter pin, cylindrical pin, or screw, to lock the interlocking pockets in place relative to each other, or may include interlocking pockets configured to directly engage with each other. In addition, the sensor mounting clamps described herein may include a flange configured to constrain longitudinal motion of a sensor.

Figure 3:
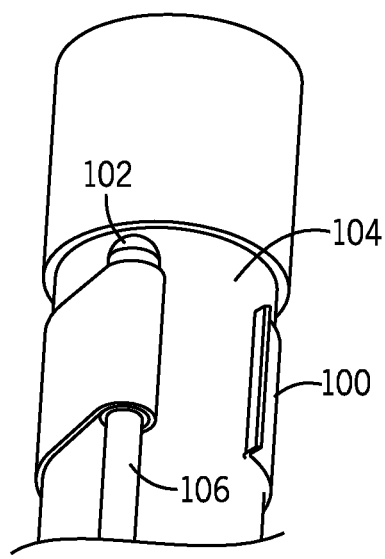
FIG. 3 is a perspective view of a sensor mounting clamp configured to hold a sensor adjacent a structure of an HVAC unit, in accordance with aspects of the present disclosure.

FIG. 3 is a perspective view of a sensor mounting clamp 100 configured to hold a sensor 102 adjacent a structure 104 of an HVAC unit 12. In the embodiments illustrated herein, the structure 104 is primarily presented as a pipe or tube of the HVAC unit 12. However, as described herein, the structure 104 may also include other types of HVAC structures including, but not limited to, other types of conduits such as ductwork of the HVAC units 12. In addition, while primarily presented herein as being a temperature sensor, in other embodiments, the sensor 102 may instead be any other type of sensor configured to detect data relating to operation of the HVAC unit 12. As illustrated in FIG. 3, in certain embodiments, the sensor 102 may be a wired sensor configured to be coupled to a sensor cable 106 that directly communicatively couples the sensor 102 to a control device 16, for example. However, in other embodiments, the sensor 102 may be a wireless sensor that includes wireless communication circuitry configured to facilitate the sensor 102 communicating wirelessly with a control device 16, for example.

Figure 4:
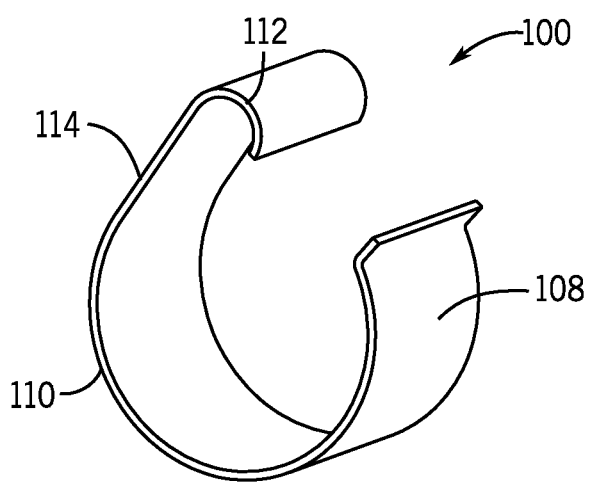
FIG. 4 is a perspective view of the sensor mounting clamp of FIG. 3, in accordance with aspects of the present disclosure.

FIG. 4 is a perspective view of the sensor mounting clamp 100 of FIG. 3. As illustrated in FIG. 4, in certain embodiments, the sensor mounting clamp 100 may include a clamp wall 108 that includes a circular segment cross-sectional portion 110 and a semicircular cross-sectional portion 112 connected to each other by a connecting portion 114. As such, the circular segment cross-sectional portion 110 of the clamp wall 108 may be referred to as ring-shaped or annular, and the semicircular cross-sectional portion 112 of the clamp wall 108 may be referred to as a half ring extending from the circular segment cross-sectional portion 110 of the clamp wall 108. In certain embodiments, the circular segment cross-sectional portion 110 of the clamp wall 108 may encompass an arc length that corresponds to a majority of a partial circle defined by the circular segment cross-sectional portion 110. In other words, in certain embodiments, the circular segment cross-sectional portion 110 of the clamp wall 108 may be referred to as a major circular segment, for example, that defines a partial circle across an angle of greater than 180 degrees, for example, between 200 degrees and 300 degrees, between 220 degrees and 280 degrees, between 240 degrees and 260 degrees, between 245 degrees and 255 degrees, or approximately 250 degrees. In general, the circular segment cross-sectional portion 110 of the clamp wall 108 is configured to fit securely around a structure 104, such as pipe or tube, of an HVAC unit 12.

In addition, in certain embodiments, the semicircular cross-sectional portion 112 of the clamp wall 108 may encompass an arc length that corresponds to approximately half of a partial circle defined by the semicircular cross-sectional portion 112. In other words, in certain embodiments, the semicircular cross-sectional portion 112 of the clamp wall 108 may define a partial circle across an angle of between 150 degrees and 210 degrees, between 160 degrees and 200 degrees, between 170 degrees and 190 degrees, between 175 degrees and 185 degrees, or approximately 180 degrees. In general, the semicircular cross-sectional portion 112 of the clamp wall 108 is configured to receive a sensor 102 and to hold the sensor 102 in place against a structure 104, such as pipe or tube, of an HVAC unit 12 when the sensor mounting clamp 100 is disposed around the structure 104. As illustrated in FIG. 4, the diameter of the semicircular cross-sectional portion 112 of the clamp wall 108 is substantially smaller than the diameter of the circular segment cross-sectional portion 110 of the clamp wall 108. For example, in certain embodiments, the diameter of the circular segment cross-sectional portion 110 of the clamp wall 108 may be three times larger, four times larger, five times larger, or even larger than the diameter of the semicircular cross-sectional portion 112 of the clamp wall 108.

As also illustrated in FIG. 4, in certain embodiments, the connecting portion 114 of the clamp wall 108 may be a substantially linear portion that connects the circular segment cross-sectional portion 110 of the clamp wall 108 to the semicircular cross-sectional portion 112 of the clamp wall 108. However, as described in greater detail herein, in other embodiments, the connecting portion 114 of the clamp wall 108 may include a rounded section, such as a concave rounded section, that connects the circular segment cross-sectional portion 110 of the clamp wall 108 to the semicircular cross-sectional portion 112 of the clamp wall 108.

It is noted that, as used herein, the terms "circular", "semicircular", "circular segment", and other such geometric terms, are intended to describe geometric shapes that approximate the terms being used. For example, the term "circular" is intended to mean a geometric shape that is generally circular in shape, but which may include minor variations, such as manufacturing tolerances, from a strictly circular shape. As such, when these terms are used herein, they should not be rigidly interpreted, but rather should be interpreted as one skilled in the art would understand these terms, for example, as including minor variations, such as manufacturing tolerances, from the geometric shapes being described.

Figure 7:
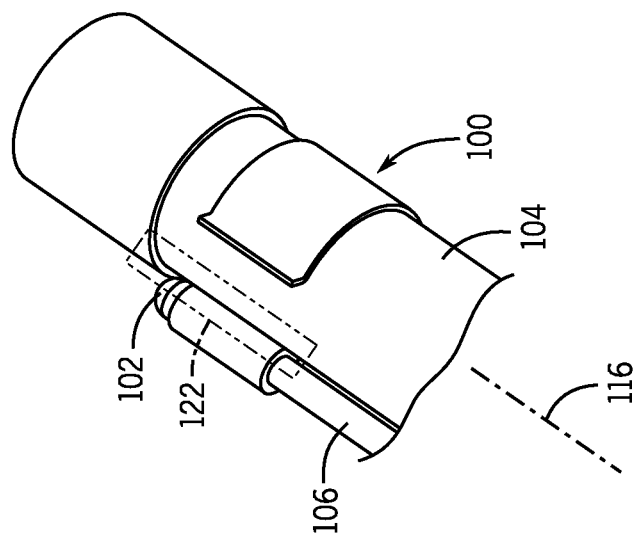
FIG. 7 illustrates a third example in which a sensor may be allowed to move relative to a structure of an HVAC unit when being held in place with the sensor mounting clamp of FIGS. 3 and 4, in accordance with aspects of the present disclosure.
Figure 6:
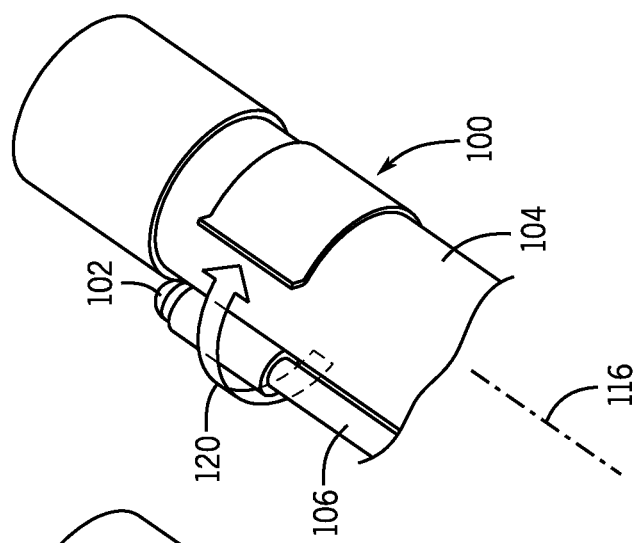
FIG. 6 illustrates a second example in which a sensor may be allowed to move relative to a structure of an HVAC unit when being held in place with the sensor mounting clamp of FIGS. 3 and 4, in accordance with aspects of the present disclosure.
Figure 5:
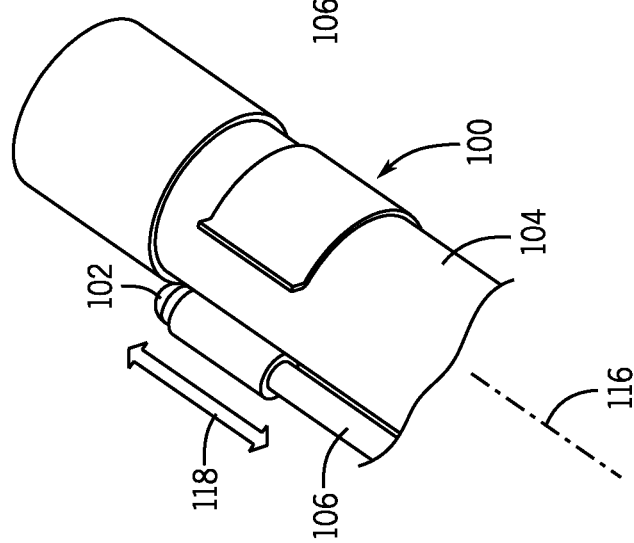
FIG. 5 illustrates a first example in which a sensor may be allowed to move relative to a structure of an HVAC unit when being held in place with the sensor mounting clamp of FIGS. 3 and 4, in accordance with aspects of the present disclosure.

In addition, it is noted that the sensor mounting clamp 100 illustrated in FIGS. 3 and 4 does not include any locking mechanism for locking the sensor mounting clamp 100 relative to a structure 104 around which the sensor mounting clamp 100 is disposed. As such, the sensor mounting clamp 100 illustrated in FIGS. 3 and 4 may enable certain inefficiencies relating to fixing the sensor 102 in one place relative to the structure 104 of the HVAC unit 12. FIGS. 5 through 7 illustrate examples of ways in which the sensor 102 may be allowed to move relative to the structure 104 of the HVAC unit 12 when being held in place with the sensor mounting clamp 100 of FIGS. 3 and 4. For example, as illustrated in FIG. 5, in certain circumstances, the sensor 102 may be allowed to move longitudinally with respect to a common longitudinal axis 116 of the sensor mounting clamp 100 of FIGS. 3 and 4 and the structure 104 of the HVAC unit 12 due to at least in part to a relative lack of tightening of the sensor mounting clamp 100 to the structure 104 of the HVAC unit 12, as illustrated by arrows 118. In addition, as illustrated in FIG. 6, in certain circumstances, the sensor 102 may be allowed to rotate about the common longitudinal axis 116 of the sensor mounting clamp 100 of FIGS. 3 and 4 and the structure 104 of the HVAC unit 12 due to at least in part to the relative lack of tightening of the sensor mounting clamp 100 to the structure 104 of the HVAC unit 12, as illustrated by arrow 120. In addition, as illustrated in FIG. 7, in certain circumstances, there may be a relatively loose point of contact 122 between the sensor 102 and the structure 104 of the HVAC unit 12 due to at least in part to the relative lack of tightening of the sensor mounting clamp 100 to the structure 104 of the HVAC unit 12.

Therefore, at least based on the sensor mounting clamp 100 illustrated in FIGS. 3 through 7 not being completely rigid, the measurements of the sensor 102 may not be entirely accurate, thereby leading to inefficient operating conditions such as relatively high compressor head temperatures, increases in compressor oil sump temperatures, increases in compressor power consumption, relatively high discharge temperatures that may adversely affect compressor windings, excessive pressure on discharge tubes, refrigerant leakage, undue stress on the compressor, performance degradation as compressor oil properties changes due to increasing oil temperature, and so forth.

Therefore, certain embodiments described herein include a sensor mounting clamp 124 having a locking mechanism 126, such as interlocking pockets or other interlocking features, which facilitate the sensor mounting clamp 124 being locked into position more tightly relative to a structure 104 of the HVAC unit 12 to overcome these drawbacks of the sensor mounting clamp 100 illustrated in FIGS. 3 through 7. As such, the embodiments of the sensor mounting clamp 124 described herein facilitate relatively accurate measurement by the sensor 102 via, for example, increased tightening of the sensor 102 against the structure 104 of the HVAC unit 12.

Figure 8:
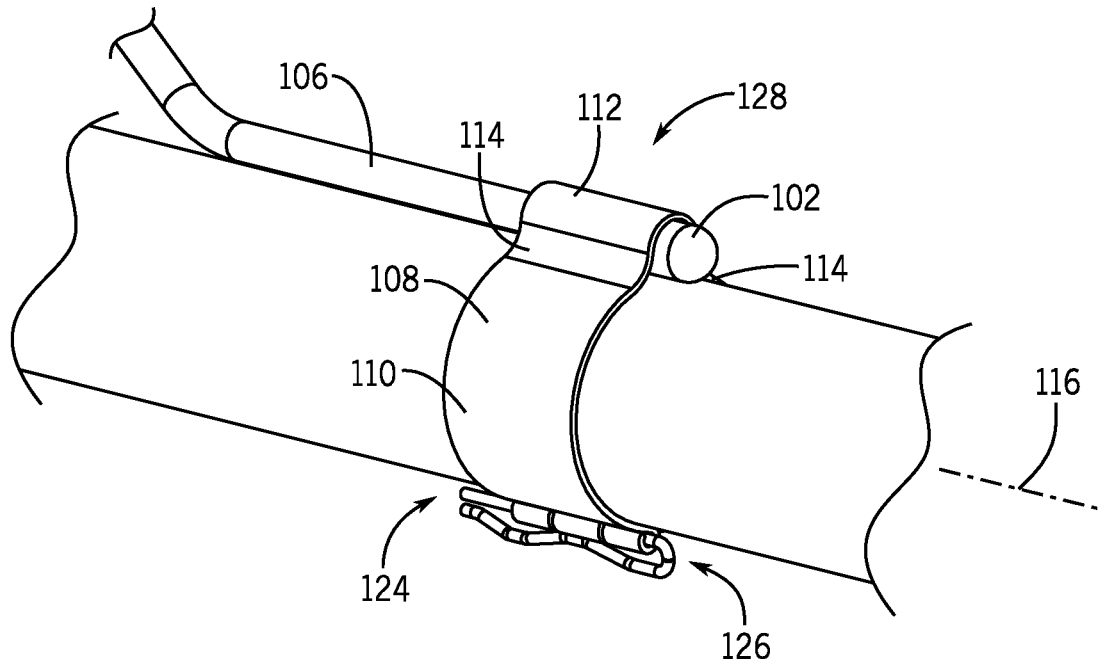
FIG. 8 is a perspective view of a sensor mounting clamp having a locking mechanism configured to hold a sensor in place against a structure of an HVAC unit, in accordance with aspects of the present disclosure.

For example, FIG. 8 is a perspective view of a sensor mounting clamp 124 having a locking mechanism 126 configured to hold a sensor 102 in place against a structure 104 of an HVAC unit 12. As illustrated in FIG. 8, in certain embodiments, a sensor mounting portion 128 of the clamp wall 108 of the sensor mounting clamp 124 may be configured to longitudinally receive the sensor 102, and to hold the sensor 102 in place against the structure 104 of the HVAC unit 12. For example, as described in greater detail herein, the sensor mounting portion 128 of the clamp wall 108 may include the semicircular cross-sectional portion 112, which extends radially outward from the circular segment cross-sectional portion 110 of the clamp wall 108. More specifically, in certain embodiments, the semicircular cross-sectional portion 112 may be connected to the circular segment cross-sectional portion 110 of the clamp wall 108 via connecting portions 114 of the clamp wall 108 extending from the semicircular cross-sectional portion 112 such that the semicircular cross-sectional portion 112 and the connecting portions 114 of the clamp wall 108 provide a space between the clamp wall 108 and the structure 104 of the HVAC unit 12 within which the sensor 102 may be disposed.

Figure 9:
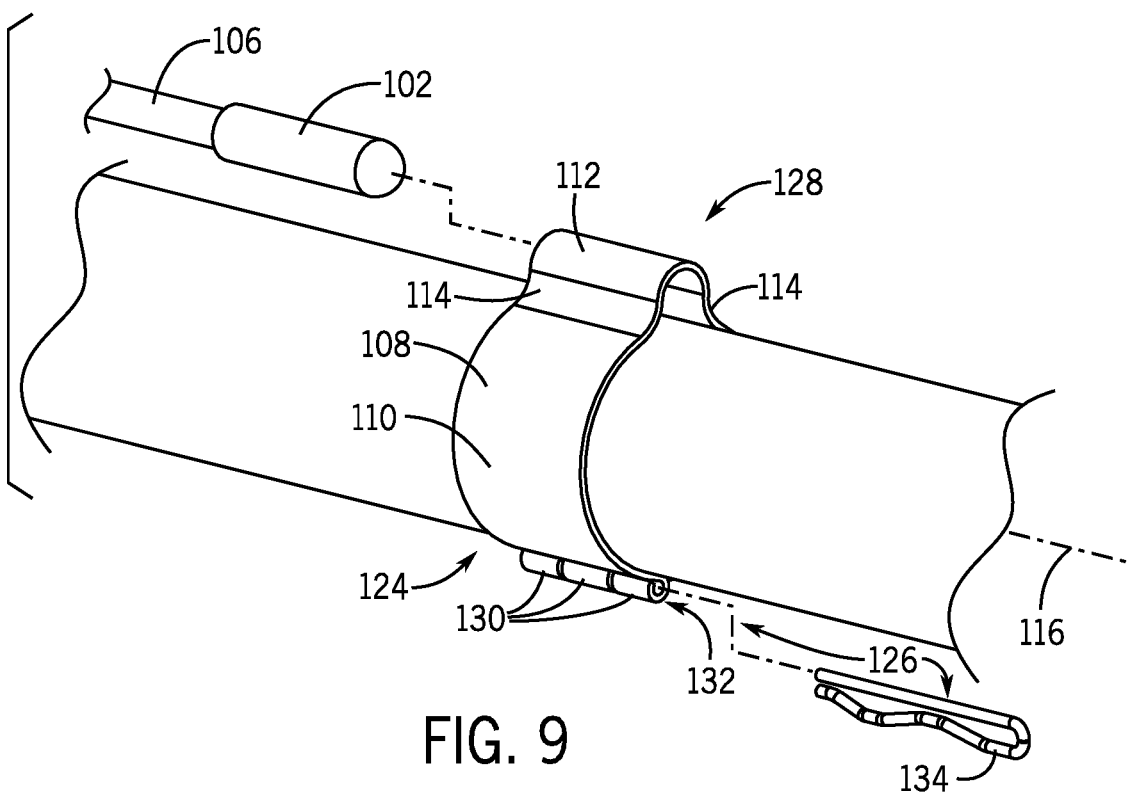
FIG. 9 is an exploded perspective view of the sensor mounting clamp, the sensor and sensor cable, and the structure of the HVAC unit of FIG. 8, in accordance with aspects of the present disclosure.

FIG. 9 is an exploded perspective view of the sensor mounting clamp 124, the sensor 102 and sensor cable 106, and the structure 104 of the HVAC unit 12 of FIG. 8. As illustrated in FIG. 9, in certain embodiments, the locking mechanism 126 of the sensor mounting clamp 124 may include interlocking pockets 130 that alternatingly extend from ends of the circular segment cross-sectional portion 110 of the clamp wall 108. For example, a first interlocking pocket 130 may extend from a first end of the circular segment cross-sectional portion 110 of the clamp wall 108, followed by a second interlocking pocket 130 that extends from a second end of the circular segment cross-sectional portion 110 of the clamp wall 108, followed by a third interlocking pocket 130 that extends from the first end of the circular segment cross-sectional portion 110 of the clamp wall 108, and so forth. In certain embodiments, interior passages 132 of the interlocking pockets 130 are configured to longitudinally align such that each of the interior passages 132 of the interlocking pockets 130 may receive a single retention piece 134, such as a cotter pin, a cylindrical pin, or a screw, at the same time to interlock the interlocking pockets 130 together, thereby locking the sensor mounting clamp 124, as well as the sensor 102, in place relative to a structure 104 of the HVAC unit 12.

FIG. 10 is a perspective view of the sensor mounting clamp 124 of FIGS. 8 and 9, and FIGS. 11 and 12 are partial perspective views of the sensor mounting clamp 124 of FIG. 10. As illustrated in FIG. 10, in certain embodiments, the clamp wall 108 includes the circular segment cross-sectional portion 110 and the semicircular cross-sectional portion 112 connected to each other by first and second connecting portions 114, which each extend from the circular segment cross-sectional portion 110. As such, the circular segment cross-sectional portion 110 of the clamp wall 108 may be referred to as ring-shaped or annular, and the semicircular cross-sectional portion 112 of the clamp wall 108 may be referred to as a half ring that extends from the circular segment cross-sectional portion 110 of the clamp wall 108 via the first and second connecting portions 114. In certain embodiments, the circular segment cross-sectional portion 110 of the clamp wall 108 may encompass an arc length that corresponds to a majority of a partial circle defined by the circular segment cross-sectional portion 110. In other words, in certain embodiments, the circular segment cross-sectional portion 110 of the clamp wall 108 may be referred to as a major circular segment, for example, that defines a partial circle across an angle of greater than 180 degrees, for example, between 280 degrees and 340 degrees, between 300 degrees and 320 degrees, between 305 degrees and 315 degrees, or approximately 310 degrees. In general, the circular segment cross-sectional portion 110 of the clamp wall 108 is configured to fit securely around a structure 104 of an HVAC unit 12. In addition, it is noted that while opposite ends 136, 138 of the circular segment cross-sectional portion 110 of the clamp wall 108 are configured to move apart from each other, when the opposite ends 136, 138 of the circular segment cross-sectional portion 110 are brought together forms the circular segment cross-sectional portion 110 as a circular segment.

In addition, in certain embodiments, the semicircular cross-sectional portion 112 of the clamp wall 108 may encompass an arc length that corresponds to approximately half of a partial circle defined by the semicircular cross-sectional portion 112. In other words, in certain embodiments, the semicircular cross-sectional portion 112 of the clamp wall 108 may define a partial circle across an angle of between 150 degrees and 210 degrees, between 160 degrees and 200 degrees, between 170 degrees and 190 degrees, between 175 degrees and 185 degrees, or approximately 180 degrees. In general, the semicircular cross-sectional portion 112 of the clamp wall 108 is configured to receive a sensor 102 and to hold the sensor 102 in place against a structure 104, such as pipe or tube, of an HVAC unit 12 when the sensor mounting clamp 124 is disposed around the structure 104. As illustrated in FIG. 10, the diameter of the semicircular cross-sectional portion 112 of the clamp wall 108 is substantially smaller than the diameter of the circular segment cross-sectional portion 110 of the clamp wall 108. For example, in certain embodiments, the diameter of the circular segment cross-sectional portion 110 of the clamp wall 108 may be three times larger, four times larger, five times larger, or even larger than the diameter of the semicircular cross-sectional portion 112 of the clamp wall 108.

As also illustrated in FIG. 10, in certain embodiments, the first and second connecting portions 114 of the clamp wall 108 may include rounded sections, such as concave rounded sections, that connect the circular segment cross-sectional portion 110 of the clamp wall 108 to the semicircular cross-sectional portion 112 of the clamp wall 108. However, in other embodiments, the first and second connecting portions 114 of the clamp wall 108 may be substantially linear portions that connect the circular segment cross-sectional portion 110 of the clamp wall 108 to the semicircular cross-sectional portion 112 of the clamp wall 108.

In addition, as illustrated in FIG. 10, in certain embodiments, the entirety of the sensor mounting clamp 124 may be comprised of a single piece, such as a single stainless steel piece. In other words, the sensor mounting clamp 124 does not include multiple pieces that are configured to move relative to each other. Rather, the sensor mounting clamp 124 only includes a single piece, where the first and second ends 136, 138 of the clamp wall 108 are configured to move apart from each other far enough such that the sensor mounting clamp 124 may fit around a structure 104 of an HVAC unit 12. Then, once the sensor mounting clamp 124 is disposed around the structure 104 of the HVAC unit 12, the first and second ends 136, 138 of the clamp wall 108 may be brought back together such that the interior passages 132 of the interlocking pockets 130 are longitudinally aligned, and the single retention piece 134 may be inserted into the interior passages 132 of the interlocking pockets 130, thereby locking the sensor mounting clamp 124, as well as the sensor 102, in place relative to the structure 104 of the HVAC unit 12. However, in other embodiments, the sensor mounting clamp 124 may be split into multiple pieces that are configured to move relative to each other, such as the clamp wall 108 being split into opposite sides having respective ends 136, 138.

As illustrated in greater detail in FIGS. 11 and 12, in certain embodiments, the interlocking pockets 130 alternatingly extend from the first and second ends 136, 138 of the circular segment cross-sectional portion 110 of the clamp wall 108. For example, a first interlocking pocket 130 may extend from the first end 136 of the circular segment cross-sectional portion 110 of the clamp wall 108, followed by a second interlocking pocket 130 that extends from the second end 138 of the circular segment cross-sectional portion 110 of the clamp wall 108, followed by a third interlocking pocket 130 that extends from the first end 136 of the circular segment cross-sectional portion 110 of the clamp wall 108, and so forth. In addition, as illustrated in FIG. 10, in certain embodiments, the sensor mounting portion 128 of the clamp wall 108 may be disposed on a side of the clamp wall 108 opposite the first and second ends 136, 138 of the clamp wall 108.

The assembly procedure for the sensor mounting clamp 124 illustrated in FIGS. 8 through 12 includes inserting the sensor mounting clamp 124 onto a structure 104 of an HVAC unit 12, inserting a sensor 102 into position within the sensor mounting portion 128 of the sensor mounting clamp 124, interlocking the first and second ends 136, 138 of the clamp wall 108 of the sensor mounting clamp 124 together via the interlocking pockets 130, and inserting the retention piece 134 into the interior passages 132 of the interlocking pockets 130 to lock the first and second ends 136, 138 of the clamp wall 108 of the sensor mounting clamp 124 relative to each other, thereby locking the sensor mounting clamp 124 and the sensor 102 in place relative to the structure 104 of the HVAC unit 12.

Figure 14:
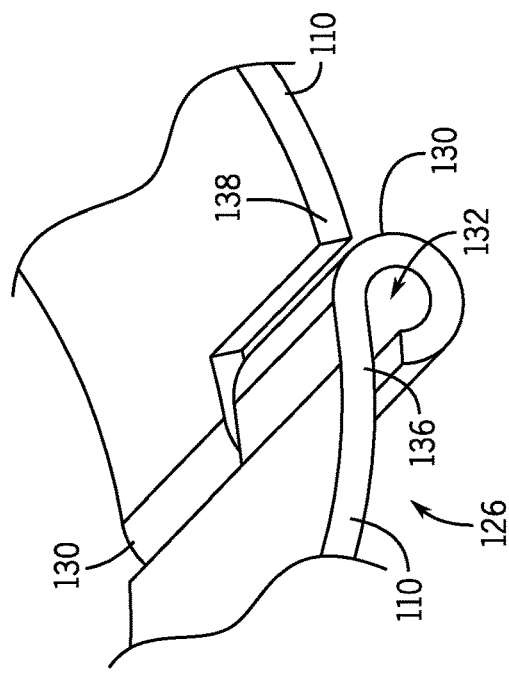
FIG. 14 is a partial perspective view of the sensor mounting clamp of FIG. 13, in accordance with aspects of the present disclosure.
Figure 15:
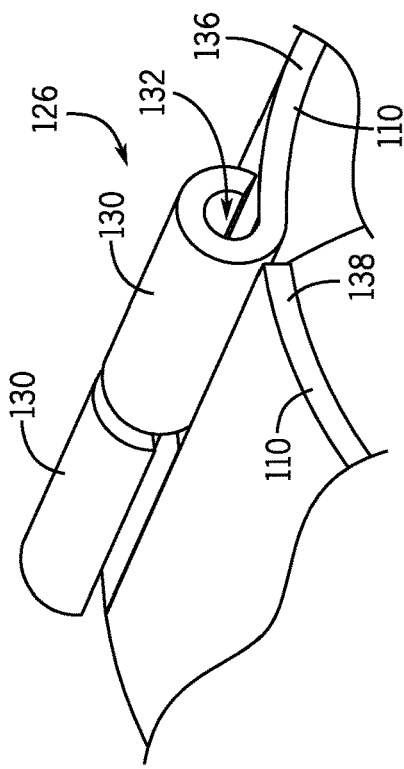
FIG. 15 is a partial perspective view of the sensor mounting clamp of FIG. 13, in accordance with aspects of the present disclosure.
Figure 13:
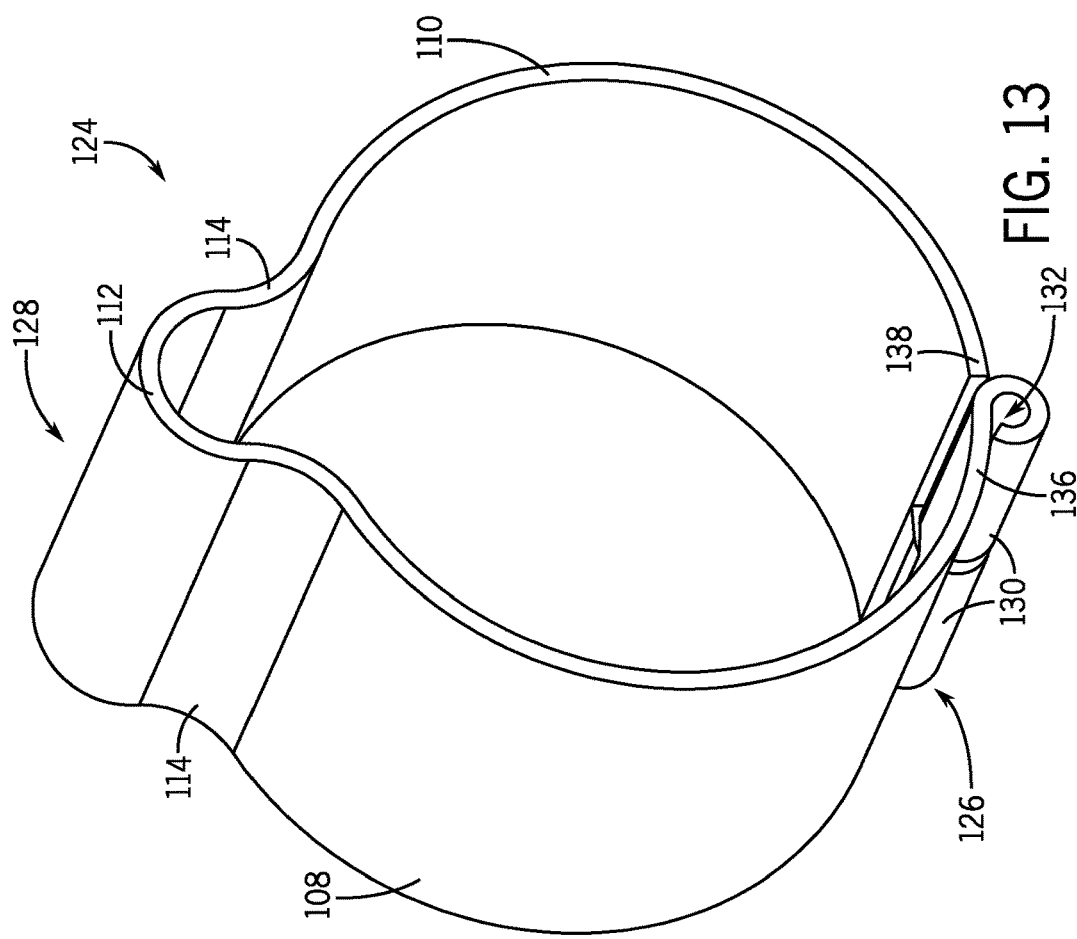
FIG. 13 is a perspective view of the sensor mounting clamp having two interlocking pockets, in accordance with aspects of the present disclosure.

The sensor mounting clamp 124 illustrated in FIGS. 8 through 12 includes three interlocking pockets 130. However, in other embodiments, the sensor mounting clamp 124 may include any number of interlocking pockets 130, such as two, three, four, five, six, seven, eight, or even more interlocking pockets 130. For example, FIG. 13 is a perspective view of the sensor mounting clamp 124 having two interlocking pockets 130, and FIGS. 14 and 15 are partial perspective views of the sensor mounting clamp 124 of FIG. 13. The embodiment of the sensor mounting clamp 124 illustrated in FIGS. 13 through 15 is substantially similar to the embodiment illustrated in FIGS. 8 through 12 except for the fact that sensor mounting clamp 124 illustrated in FIGS. 13 through 15 has two interlocking pockets 130 instead of three interlocking pockets 130.

For example, as illustrated in FIG. 13, in certain embodiments, the clamp wall 108 includes the circular segment cross-sectional portion 110 and the semicircular cross-sectional portion 112 connected to each other by first and second connecting portions 114, which each extend from the circular segment cross-sectional portion 110. As such, the circular segment cross-sectional portion 110 of the clamp wall 108 may be referred to as ring-shaped or annular, and the semicircular cross-sectional portion 112 of the clamp wall 108 may be referred to as a half ring that extends from the circular segment cross-sectional portion 110 of the clamp wall 108 via the first and second connecting portions 114. In certain embodiments, the circular segment cross-sectional portion 110 of the clamp wall 108 may encompass an arc length that corresponds to a majority of a partial circle defined by the circular segment cross-sectional portion 110. In other words, in certain embodiments, the circular segment cross-sectional portion 110 of the clamp wall 108 may be referred to as a major circular segment, for example, that defines a partial circle across an angle of greater than 180 degrees, for example, between 280 degrees and 340 degrees, between 300 degrees and 320 degrees, between 305 degrees and 315 degrees, or approximately 310 degrees. In general, the circular segment cross-sectional portion 110 of the clamp wall 108 is configured to fit securely around a structure 104 of an HVAC unit 12. In addition, it is noted that while opposite ends 136, 138 of the circular segment cross-sectional portion 110 of the clamp wall 108 are configured to move apart from each other, when the opposite ends 136, 138 of the circular segment cross-sectional portion 110 are brought together forms the circular segment cross-sectional portion 110 as a circular segment.

In addition, in certain embodiments, the semicircular cross-sectional portion 112 of the clamp wall 108 may encompass an arc length that corresponds to approximately half of a partial circle defined by the semicircular cross-sectional portion 112. In other words, in certain embodiments, the semicircular cross-sectional portion 112 of the clamp wall 108 may define a partial circle across an angle of between 150 degrees and 210 degrees, between 160 degrees and 200 degrees, between 170 degrees and 190 degrees, between 175 degrees and 185 degrees, or approximately 180 degrees. In general, the semicircular cross-sectional portion 112 of the clamp wall 108 is configured to receive a sensor 102 and to hold the sensor 102 in place against a structure 104, such as pipe or tube, of an HVAC unit 12 when the sensor mounting clamp 124 is disposed around the structure 104. As illustrated in FIG. 13, the diameter of the semicircular cross-sectional portion 112 of the clamp wall 108 is substantially smaller than the diameter of the circular segment cross-sectional portion 110 of the clamp wall 108. For example, in certain embodiments, the diameter of the circular segment cross-sectional portion 110 of the clamp wall 108 may be three times larger, four times larger, five times larger, or even larger than the diameter of the semicircular cross-sectional portion 112 of the clamp wall 108.

As also illustrated in FIG. 13, in certain embodiments, the first and second connecting portions 114 of the clamp wall 108 may include rounded sections, such as concave rounded sections, that connect the circular segment cross-sectional portion 110 of the clamp wall 108 to the semicircular cross-sectional portion 112 of the clamp wall 108. However, in other embodiments, the first and second connecting portions 114 of the clamp wall 108 may be substantially linear portions that connect the circular segment cross-sectional portion 110 of the clamp wall 108 to the semicircular cross-sectional portion 112 of the clamp wall 108.

In addition, as illustrated in FIG. 13, in certain embodiments, the entirety of the sensor mounting clamp 124 may be comprised of a single piece, such as a single stainless steel piece. In other words, the sensor mounting clamp 124 does not include multiple pieces that are configured to move relative to each other. Rather, the sensor mounting clamp 124 only includes a single piece, where the first and second ends 136, 138 of the clamp wall 108 are configured to move apart from each other far enough such that the sensor mounting clamp 124 may fit around a structure 104 of an HVAC unit 12. Then, once the sensor mounting clamp 124 is disposed around the structure 104 of the HVAC unit 12, the first and second ends 136, 138 of the clamp wall 108 may be brought back together such that the interior passages 132 of the interlocking pockets 130 are longitudinally aligned, and the single retention piece 134 may be inserted into the interior passages 132 of the interlocking pockets 130, thereby locking the sensor mounting clamp 124, as well as the sensor 102, in place relative to the structure 104 of the HVAC unit 12.

As illustrated in greater detail in FIGS. 14 and 15, in certain embodiments, the two interlocking pockets 130 extend from a respective end 136, 138 of the circular segment cross-sectional portion 110 of the clamp wall 108. In addition, as illustrated in FIG. 13, in certain embodiments, the sensor mounting portion 128 of the clamp wall 108 may be disposed on a side of the clamp wall 108 opposite the first and second ends 136, 138 of the clamp wall 108.

The assembly procedure for the sensor mounting clamp 124 illustrated in FIGS. 13 through 15 includes inserting the sensor mounting clamp 124 onto a structure 104 of an HVAC unit 12, inserting a sensor 102 into position within the sensor mounting portion 128 of the sensor mounting clamp 124, interlocking the first and second ends 136, 138 of the clamp wall 108 of the sensor mounting clamp 124 together via the interlocking pockets 130, and inserting the retention piece 134 into the interior passages 132 of the interlocking pockets 130 to lock the first and second ends 136, 138 of the clamp wall 108 of the sensor mounting clamp 124 relative to each other, thereby locking the sensor mounting clamp 124 and the sensor 102 in place relative to the structure 104 of the HVAC unit 12.

The sensor mounting clamps 124 illustrated in FIGS. 8 through 15 includes interlocking pockets 130 that have interior passages 132 configured to longitudinally align such that a retention piece 134 may be inserted into all of the interior passages 132 of the interlocking pockets 130 to lock the first and second ends 136, 138 of the clamp wall 108 in place relative to each other. However, in other embodiments, each of the first and second ends 136, 138 of the clamp wall 108 may include a single interlocking pocket 130 that extends from the respective end 136, 138, wherein the interlocking pockets 130 are configured to directly engage with each other to lock the first and second ends 136, 138 of the clamp wall 108 in place relative to each other. For example, FIG. 16 is a perspective view of the sensor mounting clamp 124 having interlocking pockets 130 that are configured to directly engage with each other, and FIGS. 17 and 18 are partial perspective views of the sensor mounting clamp 124 of FIG. 16. The embodiment of the sensor mounting clamp 124 illustrated in FIGS. 16 through 18 is substantially similar to the embodiments illustrated in FIGS. 8 through 15 except for the fact that sensor mounting clamp 124 illustrated in FIGS. 16 through 18 has interlocking pockets 130 that are configured to directly engage with each other, for example, obviating the need for a separate retention piece 134.

For example, as illustrated in FIG. 16, in certain embodiments, the clamp wall 108 includes the circular segment cross-sectional portion 110 and the semicircular cross-sectional portion 112 connected to each other by first and second connecting portions 114, which each extend from the circular segment cross-sectional portion 110. As such, the circular segment cross-sectional portion 110 of the clamp wall 108 may be referred to as ring-shaped or annular, and the semicircular cross-sectional portion 112 of the clamp wall 108 may be referred to as a half ring that extends from the circular segment cross-sectional portion 110 of the clamp wall 108 via the first and second connecting portions 114. In certain embodiments, the circular segment cross-sectional portion 110 of the clamp wall 108 may encompass an arc length that corresponds to a majority of a partial circle defined by the circular segment cross-sectional portion 110. In other words, in certain embodiments, the circular segment cross-sectional portion 110 of the clamp wall 108 may be referred to as a major circular segment, for example, that defines a partial circle across an angle of greater than 180 degrees, for example, between 280 degrees and 340 degrees, between 300 degrees and 320 degrees, between 305 degrees and 315 degrees, or approximately 310 degrees. In general, the circular segment cross-sectional portion 110 of the clamp wall 108 is configured to fit securely around a structure 104 of an HVAC unit 12. In addition, it is noted that while opposite ends 136, 138 of the circular segment cross-sectional portion 110 of the clamp wall 108 are configured to move apart from each other, when the opposite ends 136, 138 of the circular segment cross-sectional portion 110 are brought together forms the circular segment cross-sectional portion 110 as a circular segment.

In addition, in certain embodiments, the semicircular cross-sectional portion 112 of the clamp wall 108 may encompass an arc length that corresponds to approximately half of a partial circle defined by the semicircular cross-sectional portion 112. In other words, in certain embodiments, the semicircular cross-sectional portion 112 of the clamp wall 108 may define a partial circle across an angle of between 150 degrees and 210 degrees, between 160 degrees and 200 degrees, between 170 degrees and 190 degrees, between 175 degrees and 185 degrees, or approximately 180 degrees. In general, the semicircular cross-sectional portion 112 of the clamp wall 108 is configured to receive a sensor 102 and to hold the sensor 102 in place against a structure 104, such as pipe or tube, of an HVAC unit 12 when the sensor mounting clamp 124 is disposed around the structure 104. As illustrated in FIG. 16, the diameter of the semicircular cross-sectional portion 112 of the clamp wall 108 is substantially smaller than the diameter of the circular segment cross-sectional portion 110 of the clamp wall 108. For example, in certain embodiments, the diameter of the circular segment cross-sectional portion 110 of the clamp wall 108 may be three times larger, four times larger, five times larger, or even larger than the diameter of the semicircular cross-sectional portion 112 of the clamp wall 108.

As also illustrated in FIG. 16, in certain embodiments, the first and second connecting portions 114 of the clamp wall 108 may include rounded sections, such as concave rounded sections, that connect the circular segment cross-sectional portion 110 of the clamp wall 108 to the semicircular cross-sectional portion 112 of the clamp wall 108. However, in other embodiments, the first and second connecting portions 114 of the clamp wall 108 may be substantially linear portions that connect the circular segment cross-sectional portion 110 of the clamp wall 108 to the semicircular cross-sectional portion 112 of the clamp wall 108.

In addition, as illustrated in FIG. 16, in certain embodiments, the entirety of the sensor mounting clamp 124 may be comprised of a single piece, such as a single stainless steel piece. In other words, the sensor mounting clamp 124 does not include multiple pieces that are configured to move relative to each other. Rather, the sensor mounting clamp 124 only includes a single piece, where the first and second ends 136, 138 of the clamp wall 108 are configured to move apart from each other far enough such that the sensor mounting clamp 124 may fit around a structure 104 of an HVAC unit 12. Then, once the sensor mounting clamp 124 is disposed around the structure 104 of the HVAC unit 12, the first and second ends 136, 138 of the clamp wall 108 may be brought back together such that the interlocking pockets 130 may directly engage with each other, thereby locking the sensor mounting clamp 124, as well as the sensor 102, in place relative to the structure 104 of the HVAC unit 12. Specifically, as illustrated in FIGS. 16 through 18, in certain embodiments, the interlocking pockets 130 may be configured to at least partially fit within each other via, for example, complementary c-shaped cross-sectional profiles. As such, the embodiment of the sensor mounting clamp 124 illustrated in FIGS. 16 through 18 does not include a separate retention piece 134.

As illustrated in greater detail in FIGS. 17 and 18, in certain embodiments, the two interlocking pockets 130 extend from a respective end 136, 138 of the circular segment cross-sectional portion 110 of the clamp wall 108. In addition, as illustrated in FIG. 16, in certain embodiments, the sensor mounting portion 128 of the clamp wall 108 may be disposed on a side of the clamp wall 108 opposite the first and second ends 136, 138 of the clamp wall 108.

The assembly procedure for the sensor mounting clamp 124 illustrated in FIGS. 16 through 18 includes inserting the sensor mounting clamp 124 onto a structure 104 of an HVAC unit 12, inserting a sensor 102 into position within the sensor mounting portion 128 of the sensor mounting clamp 124, and directly engaging the interlocking pockets 130 extending from respective ends 136, 138 of the clamp wall 108 of the sensor mounting clamp 124 to lock the first and second ends 136, 138 of the clamp wall 108 of the sensor mounting clamp 124 relative to each other, thereby locking the sensor mounting clamp 124 and the sensor 102 in place relative to the structure 104 of the HVAC unit 12.

Figure 19:
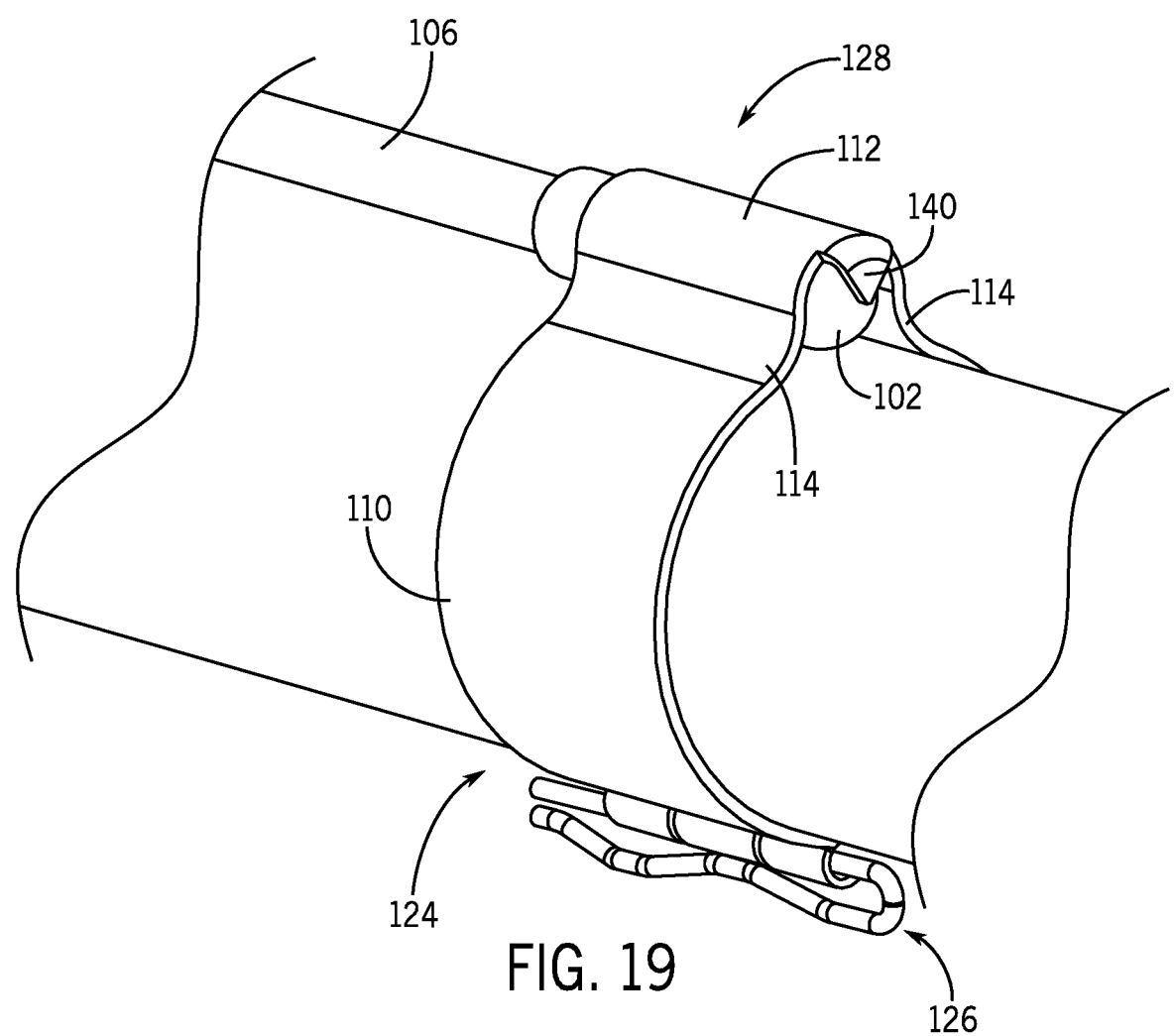
FIG. 19 is a perspective view of the sensor mounting clamp having a motion-constraining flange, in accordance with aspects of the present disclosure.
Figure 20:
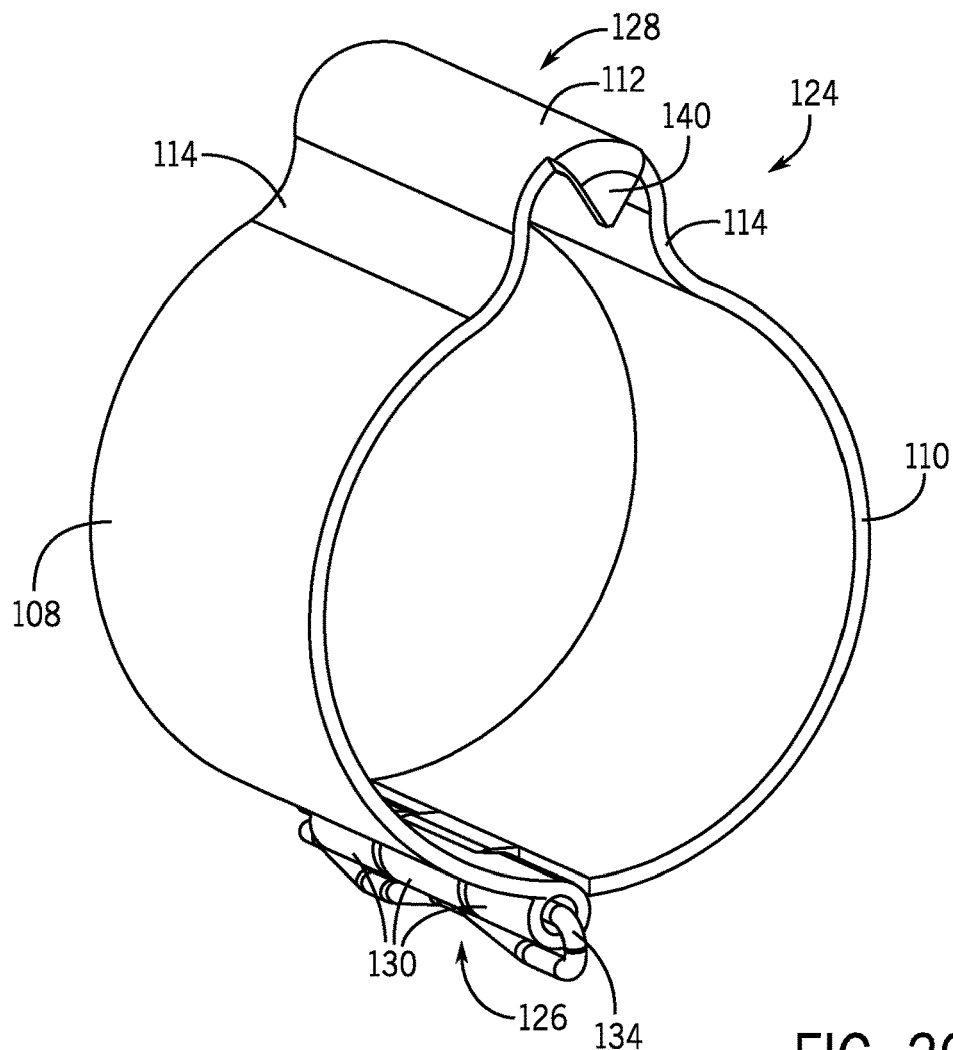
FIG. 20 is a perspective view of the sensor mounting clamp of FIG. 19, in accordance with aspects of the present disclosure.
Figure 21:
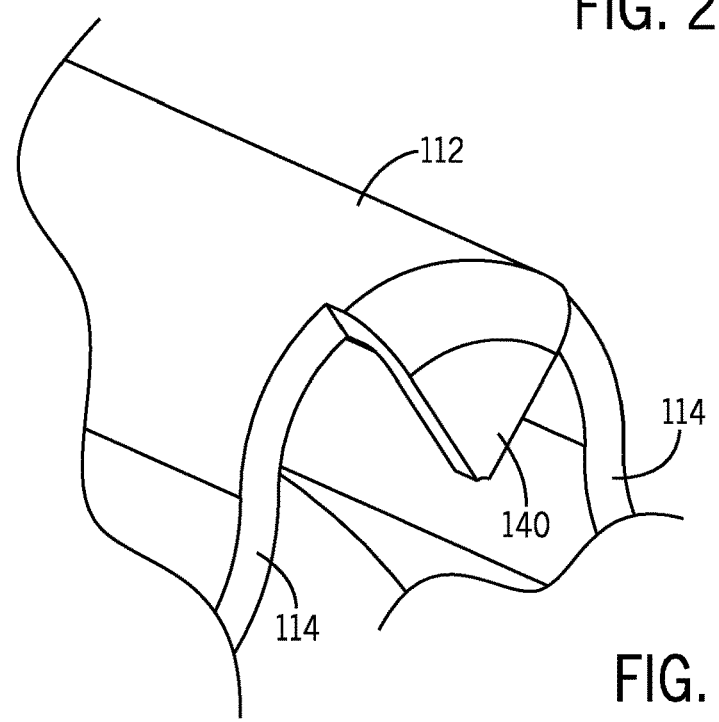
FIG. 21 is a partial perspective view of the sensor mounting clamp of FIGS. 19 and 20, in accordance with aspects of the present disclosure.

In certain embodiments, the sensor mounting portion 128 of the clamp wall 108 of the sensor mounting clamp 124 may include a motion-constraining flange 140 that is configured to constrain longitudinal movement of the sensor 102 when the sensor 102 is held in place against a structure 104 of an HVAC unit 12. For example, FIG. 19 is a perspective view of the sensor mounting clamp 124 having a motion-constraining flange 140 extending longitudinally and radially inward from the semicircular cross-sectional portion 112 of the clamp wall 108 of the sensor mounting clamp 124. In addition, FIG. 20 is a perspective view of the sensor mounting clamp 124 of FIG. 19, and FIG. 21 is a partial perspective view of the sensor mounting clamp 124 of FIGS. 19 and 20. In general, the motion-constraining flange 140 is used as a stopper for the sensor 102, which provides longitudinal motion constraint for the sensor 102, and facilitates proper functioning of the sensor 102 by helping locking the sensor 102 in place relative to the structure 104 of the HVAC unit 12. It will be appreciated that the motion-constraining flange 140 may be used with any of the embodiments described herein. More specifically, the motion-constraining flange 140 may extend longitudinally and radially inward from the semicircular cross-sectional portion 112 of the clamp wall 108 of any of the sensor mounting clamps 100, 124 described herein.

Figure 22:
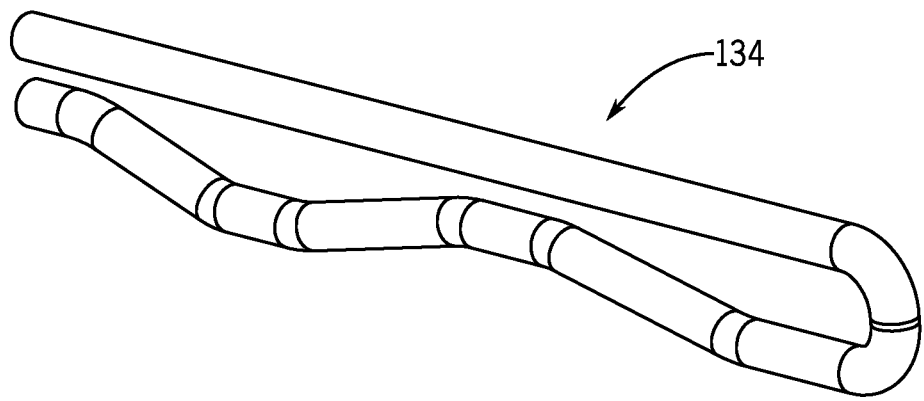
FIG. 22 is a perspective view of an example retention piece, in accordance with aspects of the present disclosure.
Figure 23:
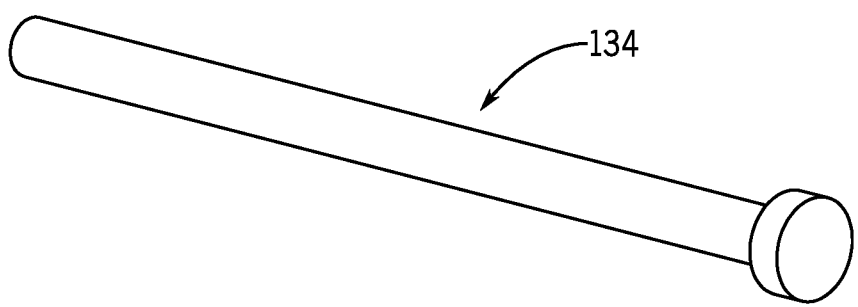
FIG. 23 is a perspective view of another example retention piece, in accordance with aspects of the present disclosure.

As described in greater detail herein, in certain embodiments, interlocking pockets 130 have interior passages 132 within which a retention piece 134 may be inserted. FIGS. 22 and 23 are perspective views of example retention pieces 134 that may be inserted into the interior passages 132 of the interlocking pockets 130. More specifically, FIG. 22 illustrates a retention piece 134 that is a cotter pin, and FIG. 23 illustrates a retention piece 134 that is a cylindrical pin. However, in other embodiments, other types of retention pieces 134 may be used, such as screws and other suitable retention pieces.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or resequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A sensor mounting clamp, comprising:
   a clamp wall in the form of a single piece, wherein the clamp wall comprises:
      an annular segment cross-sectional portion having first and second ends configured to interlock with each other via a plurality of interlocking pockets alternatingly extending from the first and second ends along a longitudinal direction of the sensor mounting clamp, wherein the first and second ends of the single piece clamp wall are configured to move apart relative to each other far enough to enable the sensor mounting clamp to be disposed around a structure; and
      a sensor mounting portion extending radially outward from the annular segment cross-sectional portion, wherein the sensor mounting portion is configured to receive and hold a sensor in place against the structure when the clamp wall is disposed around the structure.

2. The sensor mounting clamp of claim 1, wherein the sensor mounting portion comprises a semicircular cross-sectional portion connected to the annular segment cross-sectional portion via first and second connecting portions extending from the annular segment cross-sectional portion.

3. The sensor mounting clamp of claim 1, wherein the sensor mounting portion is disposed on a side of the clamp wall opposite the first and second ends of the annular segment cross-sectional portion.

4. The sensor mounting clamp of claim 1, wherein the plurality of interlocking pockets are configured to longitudinally align to receive a retention piece.

5. The sensor mounting clamp of claim 1, wherein at least one interlocking pocket extending from the first end of the clamp wall is configured to directly engage with at least one interlocking pocket extending from the second end of the clamp wall.

6. The sensor mounting clamp of claim 1, comprising two or three interlocking pockets.

7. The sensor mounting clamp of claim 1, comprising a flange extending longitudinally and radially inward from the sensor mounting portion, wherein the flange is configured to constrain longitudinal movement of the sensor when the sensor is held in place against the structure by the sensor mounting clamp.

8. The sensor mounting clamp of claim 1, wherein the single piece is comprised of stainless steel.

9. The sensor mounting clamp of claim 1, wherein each interlocking pocket comprises a c-shaped cross-sectional profile that extends from the first end or the second end.

10. A sensor mounting clamp, comprising:
a clamp wall in the form of a single piece, wherein the clamp wall comprises:
a ring-shaped segment having first and second ends configured to interlock with each other via a plurality of interlocking pockets alternatingly extending from the first and second ends along a longitudinal direction of the sensor mounting clamp, wherein the first and second ends of the single piece clamp wall are configured to move apart relative to each other far enough to enable the sensor mounting clamp to be disposed around a structure, and wherein the plurality of interlocking pockets are configured to longitudinally align to receive a retention piece; and
a sensor mounting portion extending radially outward from the ring-shaped segment, wherein the sensor mounting portion is configured to receive and hold a sensor in place against the structure when the clamp wall is disposed around the structure.

11. The sensor mounting clamp of claim 10, wherein the sensor mounting portion comprises a semicircular segment connected to the ring-shaped segment via first and second connecting portions extending from the ring-shaped segment.

12. The sensor mounting clamp of claim 10, wherein the sensor mounting portion is disposed on a side of the clamp wall opposite the first and second ends of the ring-shaped segment.

13. The sensor mounting clamp of claim 10, comprising two interlocking pockets.

14. The sensor mounting clamp of claim 10, comprising three interlocking pockets.

15. The sensor mounting clamp of claim 10, comprising a flange extending longitudinally and radially inward from the sensor mounting portion, wherein the flange is configured to constrain longitudinal movement of the sensor when the sensor is held in place against the structure by the sensor mounting clamp.

16. The sensor mounting clamp of claim 10, wherein the single piece is comprised of stainless steel.

17. The sensor mounting clamp of claim 10, wherein each interlocking pocket comprises a c-shaped cross-sectional profile that extends from the first end or the second end.

18. A sensor mounting clamp, comprising:
a clamp wall in the form of a single piece, wherein the clamp wall comprises:
a ring-shaped segment having first and second ends configured to interlock with each other via first and second interlocking pockets extending from respective first and second ends along a longitudinal direction of the sensor mounting clamp, wherein the first and second ends of the single piece clamp wall are configured to move apart relative to each other far enough to enable the sensor mounting clamp to be disposed around a structure, and wherein the first and second interlocking pockets are configured to directly engage with each other; and
a sensor mounting portion extending radially outward from the ring-shaped segment, wherein the sensor mounting portion is configured to receive and hold a sensor in place against the structure when the clamp wall is disposed around the structure.

19. The sensor mounting clamp of claim 18, wherein the sensor mounting portion comprises a semicircular segment connected to the ring-shaped segment via first and second connecting portions extending from the ring-shaped segment.

20. The sensor mounting clamp of claim 18, wherein the sensor mounting portion is disposed on a side of the clamp wall opposite the first and second ends of the ring-shaped segment.

21. The sensor mounting clamp of claim 18, comprising a flange extending longitudinally and radially inward from the sensor mounting portion, wherein the flange is configured to constrain longitudinal movement of the sensor when the sensor is held in place against the structure by the sensor mounting clamp.

22. The sensor mounting clamp of claim 18, wherein the single piece is comprised of stainless steel.

23. The sensor mounting clamp of claim 18, wherein each interlocking pocket comprises a c-shaped cross-sectional profile that extends from the first end or the second end.

* * * * *